June 29, 1937.  G. L. STRUBLER  2,085,278
MEANS FOR APPLYING VITREOUS ENAMEL
Filed Feb. 9, 1933
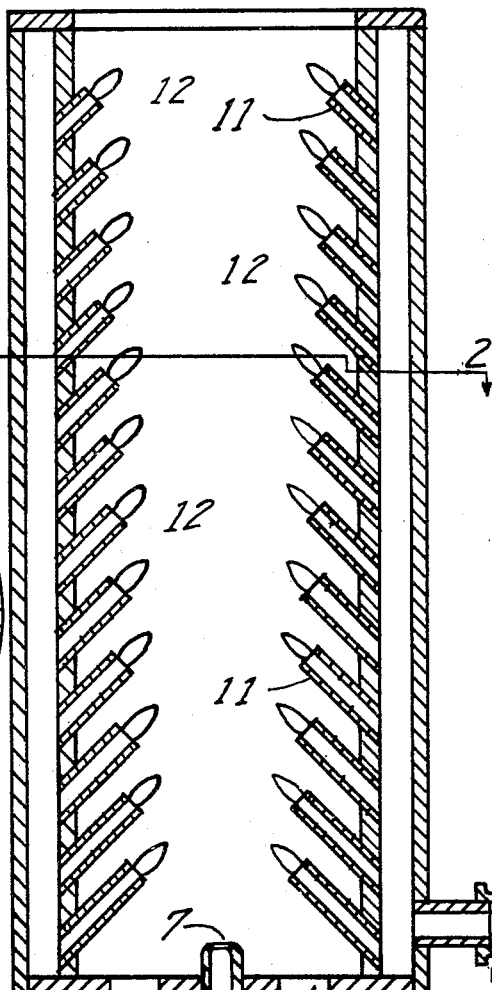
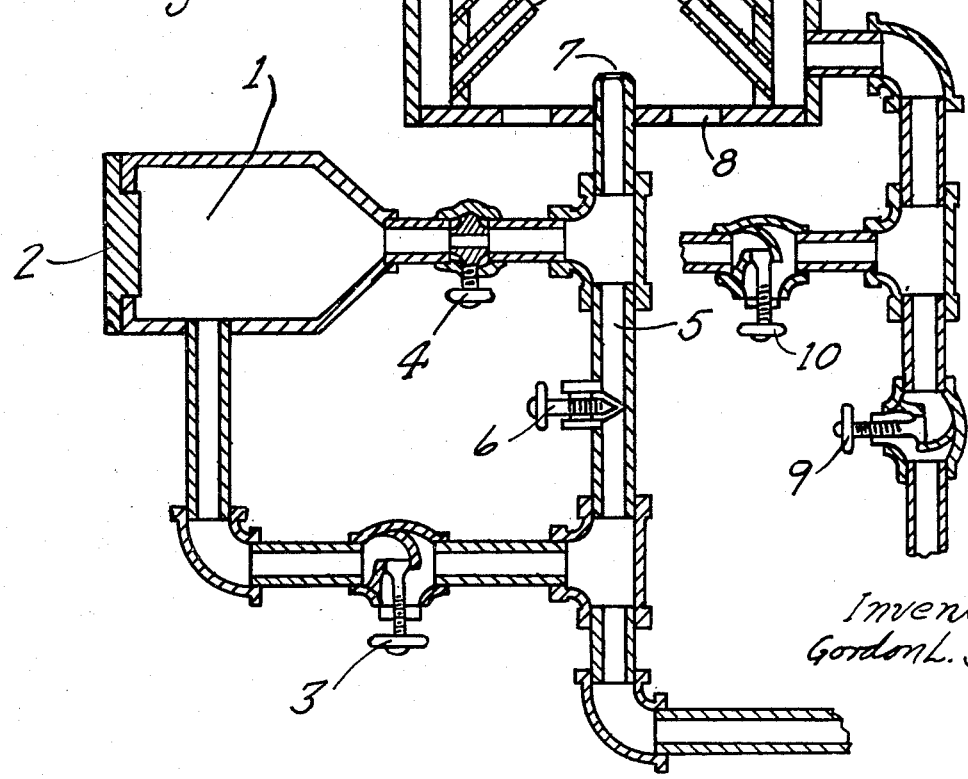
Inventor.
Gordon L. Strubler Patented June 29, 1937

2,085,278

UNITED STATES PATENT OFFICE 2,085,278

MEANS FOR APPLYING VITREOUS ENAMEL

Gordon L. Strubler, Chicago, Ill., assignor to Corning Glass Works, Corning, N. Y., a corporation of New York Application February 9, 1933, Serial No. 656,021

2 Claims. (Cl. 91—12.2)

This invention relates to means for spraying vitreous enamels or glass on to a surface and at the same time burn the enamel or glass thereon. It is a well known fact that enamels of the silicon type are water and weather proof. Vitreous enamels have been used for hundreds of years as a means of protection and weather proofing many items. My invention relates to applying vitreous enamels to parts and surfaces that do not readily adapt themselves to present equipment. The present method of applying enamels of the porcelain type requires that the part become heated to a red heat in an oven.

Limitation of oven size naturally makes it impossible to porcelain enamel many items that could be weather proofed with vitreous enamel: such as, steel bridges, freight cars, tank cars, ships, etc. In fact, with my apparatus, vitreous enamels can be applied to meet any type of surface desired, as there is no material heating of the part being enameled.

In the drawing Figure 1 is a central sectional view and Figure 2 is a view taken as indicated by the line 2 on Figure 1.

With my improved apparatus for applying the vitreous enamel, I have developed a means that this work can be done on a commercial scale at a very reasonable cost.

To explain more fully, drawing is attached, and such reference will be made to more clearly show where my invention has practical merit.

Referring to Figure 1, a burner so designed that the enamel is admitted to container 1, through filler 2, the enamel is forced by air pressure, admitted at 3, through valve 4, into mixing chamber 5, valve 6 is adjustable to control the flow of air to blow enamel into the burner through orifice 7. Auxiliary air is admitted through holes 8 fitted with shutters (not shown). A gas valve 9 and air valve 10 control the fuel and air streams.

These valves can be regulated until the flame burns properly. The burner can be built with two tubes, so constructed that it combines a holder and mixing chamber for the gas and air. The parts 11 admit the gas to the burning chamber. When enamel is blown through orifice 7, it floats toward the outlet of the burner. By drilling the holes 11 at an angle to the side of the tube toward the outlet end, the speed of flow may be increased. By passing the powdered enamel through the heated zone 12, the dustlike particles are melted into a liquid and adhere very strongly to any surface where they are deposited. By building the sprayer with a large number of holes, it is possible to extend the heated zone 12 long enough to allow the enamel to become very fluid during its floating through the machine.

Also the large number of holes serve to keep the enamel from striking the sides of the sprayer.

My invention consists of so building a burner which will not clog, as sufficient space is allowed from orifice 7 to the heated zone and cool air is admitted through inlets 8 sufficient to keep the heat away from orifice 7. This air circulation also helps in controlling the flow of the enamel through the burner by placing the air inlets and the flow of cool air so that the enamel flow is surrounded by cool air. The enamel flow can be confined as much as desired.

With my preferred design, I use either city gas or compressed butane or propane gases, or a combination to them, for the development of my heat. With either compressed air, oxygen, or a combination of air and oxygen. Also with this burner I have developed, I can have a large heated zone, and therefore am able to allow a large quantity of enamel flow through at a time, thereby making it possible to cover a large surface in a shorter time, and thereby making it usable in many places where the very slow method would not be practical.

While in the foregoing there has been shown and described the preferred embodiment of my invention, it is to be understood that minor changes in the details of construction, combination and arrangement of parts may be resorted to without departing from the spirit and scope of the invention as claimed.

I claim as my invention:

1. Apparatus for coating a surface with vitreous material, comprising, an elongated casing with one end open and unobstructed, fluid pressure means for projecting finely divided fusible vitreous material through said casing and out through said open end, and multiple flame projecting means in the casing and along the length thereof so directed as to heat said material and float the same to keep said material away from the walls of the casing while passing therethrough.

2. Apparatus for coating a surface with vitreous material, comprising, an elongated casing with one end open and unobstructed, fluid pressure means for projecting finely divided fusible vitreous material through said casing and out through said open end, and multiple flame projecting means arranged in the casing circumferentially and longitudinally thereof and pointed inwardly and toward the open end of the casing, whereby the flames projected thereby heat said material and float the same to keep it away from the walls of the casing while passing therethrough.

GORDON L. STRUBLER.